United States Patent

[11] 3,550,880

| [72] | Inventor | Allan M. Palmer |
| | | Rochester, N.Y. |
| [21] | Appl. No. | 731,377 |
| [22] | Filed | May 23, 1968 |
| [45] | Patented | Dec. 29, 1970 |
| [73] | Assignee | Eastman Kodak Company |
| | | Rochester, N.Y. |
| | | a corporation of New Jersey |

[54] FILM STRIPPING MECHANISM
9 Claims, 7 Drawing Figs.

[52] U.S. Cl. .................................................. 242/192,
242/195
[51] Int. Cl. .................................................. G11b 15/32,
G11b 15/66
[50] Field of Search........................................... 242/192,
195, 197, 198, 71.1, 71, 78.8; 352/157, 158, 72,
78; 274/4, 11; 179/100.2(2)

[56] References Cited
UNITED STATES PATENTS

| 2,273,884 | 2/1942 | Nyberg.......................... | 242/78.8 |
| 3,010,672 | 11/1961 | Cecil, Jr. ....................... | 242/78.8 |
| 3,429,518 | 2/1969 | McKee......................... | 242/192 |

Primary Examiner—George F. Mautz
Attorneys—Robert W. Hampton and G. Herman Childress ABSTRACT: A film stripping mechanism is mounted for pivotal movement about a supporting mechanism so that it can assume various angular positions as it is moved into contact with the outer convolution of film having various diameters while maintaining the desired relation to a film driving belt.

ALLAN M. PALMER
INVENTOR.

BY G. Herman Childress
Robert W. Hampton
ATTORNEYS

PATENTED DEC 29 1970

ALLAN M. PALMER
INVENTOR

BY *G. Herman Childress*
*Robert W. Hampton*
ATTORNEYS 3,550,880

FILM STRIPPING MECHANISM

CROSS-REFERENCES TO RELATED APPLICATIONS

Reference is made to the following commonly assigned copending U.S. Pat. applications: Ser. No. 706,703, filed Feb. 19, 1968 in the name of Edward S. McKee, entitled DEVICE FOR STRIPPING AND FEEDING STRIP MATERIAL FROM A ROLL, now U.S. Pat. 3,429,518; Ser. No. 643,503, filed June 5, 1967 in the name of John J. Bundschuh et al., entitled CARTRIDGE FOR REEL OF STRIP MATERIAL; and Ser. No. 685,616, filed Nov. 24, 1967 in the name of John J. Bundschuh et al. entitled CINEMATOGRAPHIC PROJECTORS OR THE LIKE AND CARTRIDGES FOR USE THEREWITH.

BACKGROUND OF THE INVENTION

This invention relates to film stripping mechanisms for removing film from a reel of film within a cartridge on a motion picture projector or the like.

Earlier film stripping mechanisms, such as described in the previously mentioned, copending applications, include a belt which is movable into a cartridge for engaging a roll of film therein for driving the film roll in an unwinding direction and a stripper finger which is also movable into the cartridge for deflecting the end portions of the film from the roll and into a narrow channel formed by the stripper finger and one reach of the belt. While these mechanisms have proved quite satisfactory in operation, it has been deemed desirable to provide a film stripping mechanism which is more readily usable with reels of film having widely varying outside diameters. This wider versatility will permit the single film stripping mechanism to be used with virtually any sized film roll which can be received by a particular projector without sacrificing the desired tolerances between a stripper finger and the driving belt.

SUMMARY OF THE INVENTION

Accordingly, among the several objects of the invention may be noted the projection of a film stripping mechanism including a stripper finger which is mounted so that it will assume different angular positions when used for stripping film from rolls of film having widely varying outside diameters. Other objects and advantages of the invention will become apparent from the following description of the invention.

In accordance with the present invention, a film stripping finger or the like is carried by a positioning lever for movement into and out of a cartridge containing a reel of motion picture film. The stripper finger is mounted on the lever by means of a plurality of pivots and coacting grooves or slots to effect movement of the stripper finger into two or more positions with respect to the roll of film in the cartridge, depending upon the outside diameter or position of the roll of film.

BRIEF DESCRIPTION OF THE DRAWINGS

FIG. 1 is a view illustrating a film stripping mechanism of this invention in its inoperative position with respect to a roll of motion picture film or the like.

Corresponding reference characters indicate corresponding parts throughout the several views of the drawings.

DESCRIPTION OF THE PREFERRED EMBODIMENTS

Figure 1:
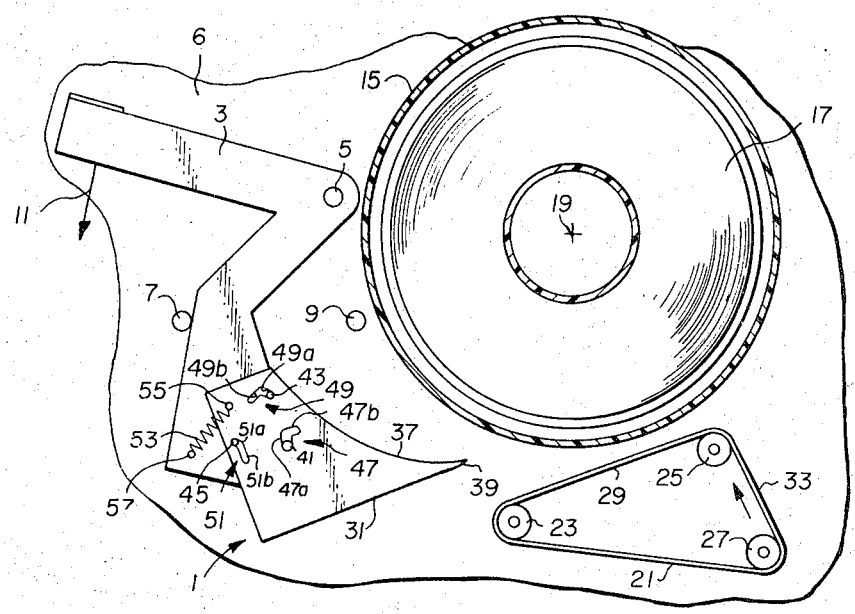
Figure 2:
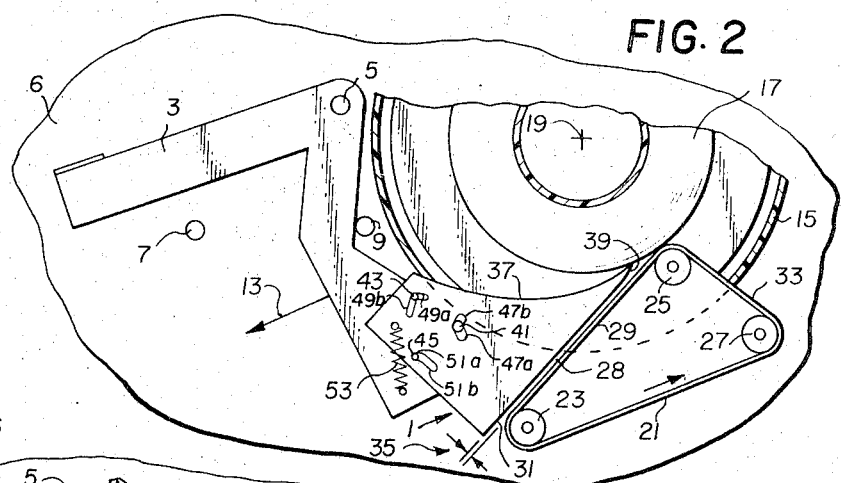
FIGS. 2 and 3 are fragmentary views similar to FIG. 1 showing the film stripping mechanism in two additional positions.
Figure 3:
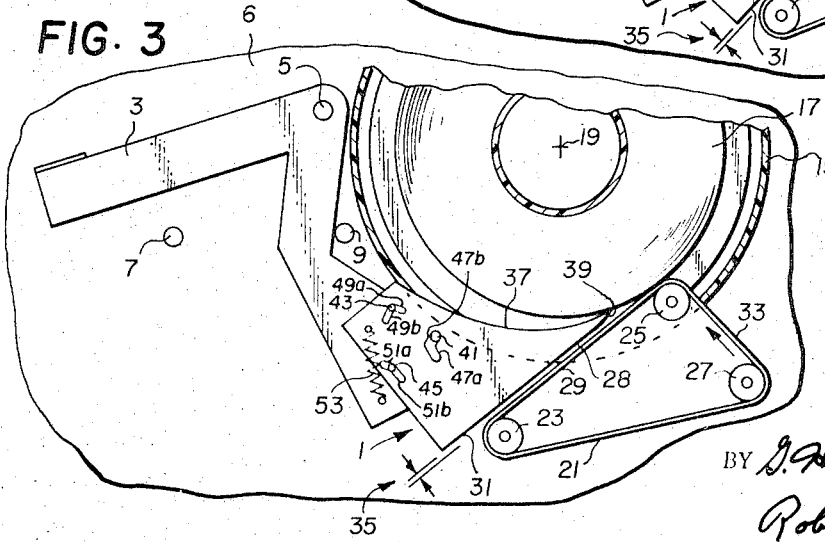

Referring to FIGS. 1—3, a film stripping mechanism of the invention comprises a film stripping finger or member generally designated 1 supported by a lever 3. The lever is pivoted at 5 to a wall 6 of a motion picture projector for movement between the position illustrated in FIG. 1 wherein it engages a stop 7 and the position illustrated in FIGS. 2 and 3 wherein it bears against a stop 9. The lever is moved from the FIG. 1 position by means diagrammatically illustrated at 11, and is returned to the FIG. 1 position by suitable means diagrammatically illustrated at 13. This movement of lever 3 controls movement of the stripper finger into and out of a cartridge 15 and into and out of engagement with the outer convolution of a roll of film 17 positioned within the cartridge. The film may be wound onto the hub of a reel and rotated about an axis 19 of a spindle forming part of the projector.

An endless belt 21 is trained about a drive pulley 23 and two idler pulleys 25 and 27. The belt is driven in the direction indicated by the arrows and the unit comprising the belt and pulleys can be swung about the axis of pulley 23 from its normal or retracted position shown in FIG. 1 through an opening in cartridge 15 and into its operative position (FIGS. 2 and 3) wherein it is in engagement with the outer convolution of film roll 17 to drive the film roll in an unwinding (clockwise) direction. Means for driving the belt and for swinging it to its operative position are disclosed in more detail in the beforementioned copending patent applications.

When the belt and finger are in their operative positions with the cartridge as illustrated in FIGS. 2 and 3, film is removed from the roll 17 by using the belt to drive the film roll in an unwinding direction, and using the finger 1 to lift the leading end of the film from the roll. The film is fed through a substantially closed channel 28 formed by one reach 29 of the belt and the adjacent elongate side edge 31 of the stripper. As the film leaves channel 28 it is threaded through the usual film drive mechanism of the projector, and this threading operation is preferably accomplished by directing the film from channel 28 into automatic film threading means forming part of the projector. The film stripping mechanism of the invention is preferably constructed so that reach 29 and edge 31 are substantially parallel to each other whenever they are in contact with a film roll. Thus channel 28 is substantially the same width throughout its length. The spacing between reach 29 and edge 31 is designated 35, and the novel mechanisms of this invention permit use of the film stripping mechanism with rolls of film having widely varying outside dimensions without changing the dimension 35.

Film stripping finger 1 has an arcuate edge 37 which meets the edge 31 at a rounded end portion 39. End 39 is the only portion of the stripping finger which normally engages the film roll and, in operation, it tends to separate the leading end of the film from the film roll and direct the film through channel 28.

There are times when a film roll tends to clockspring, resulting in the outer convolution of film being separated from the main body of the film roll. When this occurs the leading end of the film strip engages a second reach 33 of the belt and is driven along this reach and between pulley 25 and the film roll.

The film stripping finger is coupled to the lever 3 for limited and controlled movement with respect to the lever by means of three pins or posts 41, 43 and 45 which are secured to lever 3 and which project through corresponding guide slots or grooves 47, 49 and 51, respectively, in the finger. Slot 47 has two arcuate end portions 47a and 47b which are substantially perpendicular to each other. Similarly, slot 49 has arcuate end portions 49a and 49b extending at substantially right angles with respect to each other. Slot 51 has arcuate end portions 51a and 51b inclined at an obtuse angle.

The centers of curvature for slot portions 47a and 49a are located at the closed end of slot portion 51a. The centers of curvature for slot portions 47b and 51a are located at the intersection of slot portions 49a and 49b. The centers of curvature for slot portions 49b and 51b are located at the closed end of slot portion 47b. This relation between the various portions of the guide slots permits the desired limited and controlled pivotal movement of the finger 1 on lever 39 as described more fully hereinafter.

A tension spring 53 is connected at 55 and 57 to the stripper finger and to the lever 3 to bias the stripper finger in a counterclockwise direction into its normal or rest position (FIG. 1) wherein pivot 41 is located at the closed end of the slot portion 47a, pivot 43 is at the closed end of slot portion 49a, and pin 45 is at the closed end of slot 51a.

When lever 3 moves away from stop 7 into engagement with stop 9 the stripping finger 1 swings about the axis of pivot 5 into the cartridge 15. During initial movement of the lever away from stop 7, and before the lever engages stop 9, the tip end 39 of the stripping finger engages the outer convolution of the roll of film 17. During subsequent movement of lever 3 into engagement with stop 9, the reaction between the end 39 of the finger and the roll causes the stripping finger to rotate clockwise against the bias of spring 53 about pins 41, 43 and/or 45 to adjust the position of the stripping finger relative to lever 3. The extent of rotation of finger 1 relative to the lever and the axis of its rotation depends upon the outside diameter of the roll of film. This rotational movement will now be described in detail.

After tip end 39 of the finger first contacts the roll of film, the stripping finger initially swings about the axis of pin 45 toward the position illustrated in FIG. 2 wherein pins 41 and 43 are located at the intersection of the inclined end portions of the respective slots 47 and 49. Thus for rolls of film with comparatively small outside diameters, the stripper finger can assume any of the various positions throughout a range of positions between the positions illustrated in FIGS. 1 and 2.

When film rolls having substantially larger outside diameters are positioned within the cartridge, then the stripper finger needs to rotate clockwise to a greater extent with respect to lever 3 in order to maintain the desired relation between belt reach 29 and edge 31 of the stripper. Therefore, when large diameter film rolls are encountered, the stripper finger first moves about pin 45 from the FIG. 1 position to the FIG. 2 position as previously described. Further rotation about pin 45 is prevented due to the engagement between pins 41 and 43 and the left side edges of their respective slots. However, the continuing reaction between the film roll and the finger end 39 now produces rotational movement about pin 43 in a clockwise direction until the pin 41 is seated in the closed end of slot portion 47b and pin 45 is located at the intersection between slot portions 51a and 51b as shown in FIG. 3. Further clockwise rotation about pin 43 is prevented by engagement between pin 41 and the closed end of slot portion 47b. Movement of the finger within this second range of positions (i.e., from the FIG. 2 to the FIG. 3 position) is sufficient to properly strip film from the film rolls having outside diameters of intermediate size, e.g. 100—200 foot film rolls. Where even larger rolls of film are encountered, e.g. 400 foot rolls of film, the stripper finger can rotate clockwise about pin 43 from its FIG. 3 position until pin 43 or pin 45 reaches the closed end of its respective slot portion 49b or 51b. The position within this third range of positions that the finger actually assumes is determined by the outside diameter of the film roll. When lever 3 is moved away from stop 9 and into contact with stop 7, spring 53 returns the stripper finger through the positions shown in FIGS. 2 and 3 to the FIG. 1 position.

As will be apparent from the foregoing description and from an examination of the drawings, the unique manner in which the stripper member is mounted on and moved with respect to lever 3 permits the finger to be used for stripping film from rolls having widely varying outside diameters without significantly changing the important relation between edge 31 of the stripper finger and reach 29 of the belt.

FIGS. 4—7 illustrate an embodiment of the invention which is particularly useful in connection with belt drive means generally designated 65 which, for example, may be of the type described in the beforementioned copending application Ser. No. 685,616. Drive means 65 is similar to the belt structure illustrated in FIGS. 1—3, however, reach 67 is inclined at a substantially greater angle with respect to reach 69. Due to the different construction and operation of drive 65, the stripping finger can travel in a somewhat different path while maintaining the desired dimension 35' between stripping finger and reach 69 of the belt. The mechanism illustrated in FIGS. 4—7 is similar to the mechanism shown in FIGS. 1—3 and, accordingly, similar parts have been designated by the same reference characters used in FIGS. 1—3.

Figure 4:
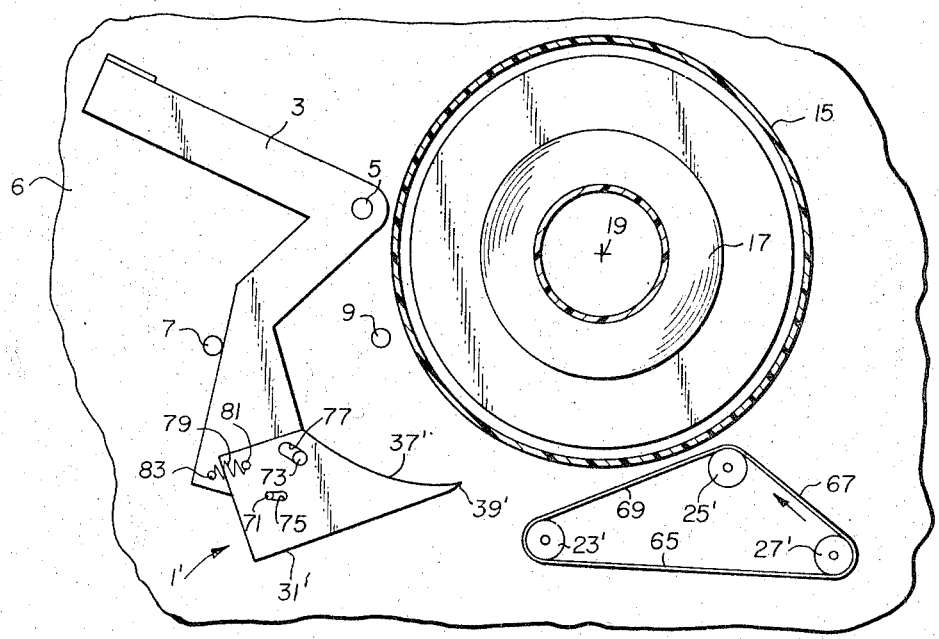
FIG. 4 is a view illustrating another embodiment of invention.

A stripping finger 1' is connected to lever 3 by means of two pins or posts 71 and 73 which project through curved guide slots 75 and 77, respectively. These slots curve towards an imaginary point located between the pins and the tip end 39' of the stripper member, and the center of curvature of each slot lies within the other guide slot. A spring 79 attached at 81 and 83 to the stripper member and to the lever 3, respectively, biases the stripper finger into its normal or inoperative position as shown in FIG. 4.

Figure 5:
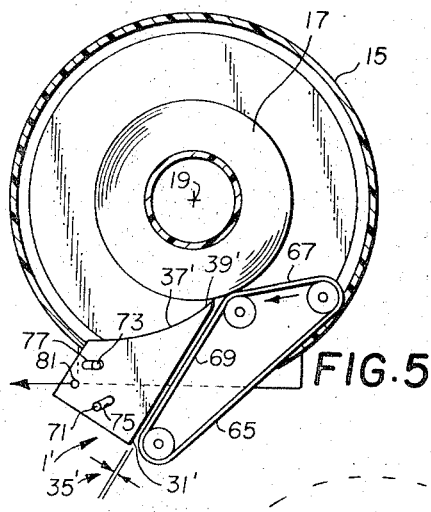
FIGS. 5—7 are views similar to FIG. 4 showing moved positions of the FIG. 4 mechanism.

When lever 3 is moved into engagement with stop 9 to move the stripper finger into the cartridge and into engagement with a roll of film, the tip 39' of the finger first swings counterclockwise in an arcuate path about pivot 5 until it contacts the outer convolution of the film. Then the reaction between the film roll and the finger swings the upper portion of the stripper finger clockwise against the biasing force of spring 79 to move the left end of slot 77 into engagement with pin 73. For comparatively small diameter rolls of film (as shown in FIG. 5), the finger contacts the film just before the lever reaches stop 9. Thus there is very little pivotal movement of the finger, and the finger may assume any of the various positions within the range of positions between the positions shown in FIGS. 4 and 5.

Figure 6:
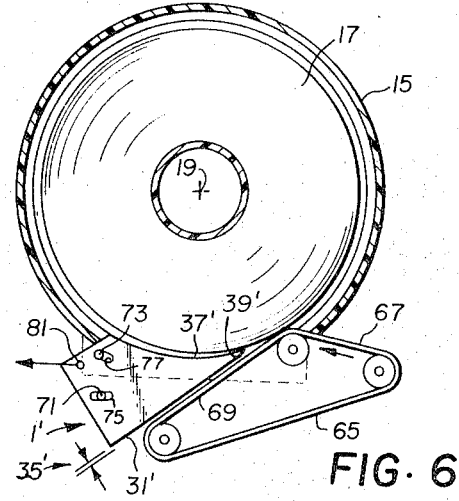

For the film rolls having a larger diameter such as shown in FIG. 6, the stripper 1' first pivots as described in connection with FIG. 5, and, thereafter, it pivots about the axis of pin 73 in a clockwise direction. This movement can continue until the right end of slot 75 engages pin 71. FIG. 6 illustrates pin 71 approximately midway between the ends of slot 75, thereby indicating that rolls of film having even greater outside diameters than illustrated in FIG. 6 can be accommodated within the cartridge without exceeding the permissible movement of the stripper finger in a clockwise direction.

Figure 7:
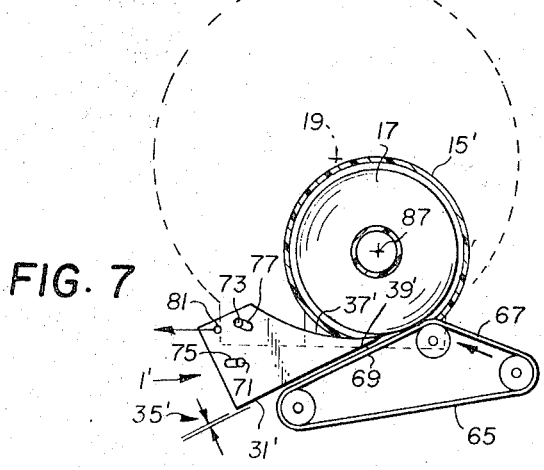

FIGS. 5 and 6 illustrate the use of film rolls having different diameters but with the same axis of rotation 19 within the cartridge. In some instances the axis of rotation of the roll changes for cartridges of various sizes. This is illustrated in FIG. 7 wherein a small roll of film is adapted to rotate about an axis 87 which if offset from the axis 19 of rotation of the larger rolls shown in FIGS. 5 and 6. The position and outside diameter of the roll illustrated in FIG. 7 is such that the stripper finger 1' is moved to its extreme clockwise position for engaging the outer convolution of film.

As will be apparent from an examination of FIGS. 5—7, in each case the lower edge 31' of the stripper finger is substantially parallel to the reach 69 of the belt and the spacing 35' therebetween remains substantially constant and uniform for all sizes of rolls in the cartridge and for changes in the axes of rotation of the rolls. Thus, the desired tolerances between the film stripping finger and the belt are maintained even though wide variations are encountered between the diameter and location of the axes of the film rolls.

The invention has been described in detail with particular reference to preferred embodiments thereof, but it will be understood that variations and modifications can be effected within the spirit and scope of the invention as described hereinabove and as defined in the appended claims.

I claim:

1. Film stripping means for directing the leading end of a strip of film or the like from a roll of film, said film stripping means comprising:

a film stripping member having a portion positionable adjacent the outer convolution of the film roll;

a carrier member for moving said stripping member with respect to the roll of film; and means mounting said stripping member on said carrier member for limited and controlled movement relative to said carrier member, said mounting means comprising guide means in the form of two pins extending from one of said members and two cooperating guide slots having arcuate portions in the other of said members, each of said slots receiving one of said pins, said stripping member being movable through (1) a first range of positions relative to said carrier member wherein said stripping member moves about an axis passing through one of said pins, and (2) a second range of positions wherein said stripping member moves about an axis passing through the other one of said pins.

2. Film stripping means as set forth in claim 1 wherein the center of curvature of the arcuate portion of each one of said slots is located within the boundary of the other of said slots.

3. Film stripping means for directing the leading end of a strip of film or the like from a roll of film, said film stripping means comprising:
a stripping member having a portion positionable adjacent the outer convolution of the film roll;
a carrier for moving said member with respect to the roll of film;
means mounting said member on said carrier for limited and controlled movement with respect to said carrier;
a drive belt mounted for movement between a first position wherein the belt is spaced from the film roll and a second position wherein a reach of the belt is in engagement with the film roll and operable to drive said roll in a direction to unwind the strip of film from the roll; and
said mounting means comprising guide means arranged and positioned with respect to said carrier and said stripping member for guiding said stripping member into a position in close proximity to a portion of said belt when the belt and stripping member are in engagement with the film roll.

4. Film stripping means for directing the leading end of a strip of film or the like from a roll of film, said film stripping means comprising:
a stripping member having a portion positionable adjacent the outer convolution of the film roll;
a carrier for moving said member with respect to the roll of film; and
means mounting said member on said carrier for limited and controlled movement with respect to said carrier, said mounting means comprising three pins mounted on said carrier and three guide slots in said member, each of said slots receiving a pin on said carrier, said pins and slots being arranged with respect to each other to guide said member through (1) a first range of positions with respect to said carrier about an axis passing through a first one of said pins, (2) a second range of positions with respect to said carrier wherein said member moves about an axis passing through a second one of said pins, and (3) a third range of positions with respect to said carrier wherein said member moves about an axis passing through a third one of said pins.

5. Film stripping means for directing the leading end of a strip of film from a roll of film during rotation of the film roll in an unwinding direction about a predetermined axis of rotation, said film stripping means comprising:
a member having a film stripping portion engageable with the film roll for separating the leading end of the film from the film roll;
a carrier for said member, said carrier being movable between first and second positions for moving said portion of the member into and out of engagement with the film roll;
means coupling said member to said carrier for rotational movement of the member with respect to the carrier about two spaced axes; and
means biasing said member into a first position with respect to said carrier, and said member being movable to a second position with respect to said carrier by the reaction between said member and the film roll when said carrier moves said portion of the member into engagement with the roll.

6. Film stripping means for directing the leading end of a strip of film from a roll of film during rotation of the film roll in an unwinding direction about a predetermined axis of rotation, said film stripping means comprising:
a member having a film stripping portion engageable with the film roll for separating the leading end of the film from the film roll;
a carrier for said member, said carrier being movable between first and second positions for moving said portion of the member into and out of engagement with the film roll; and means coupling said member to said carrier for rotational movement of the member with respect to the carrier about two spaced axes, said coupling means comprising two pins projecting from said carrier in spaced relation to each other, and two arcuate guide slots in said member, each of said guide slots receiving one of said pins thereby to mount said member for arcuate movement with respect to the carrier about axes passing through each of said pins.

7. Film stripping means as set forth in claim 6 wherein said coupling means further comprises: a third pin projecting from said carrier, and a third arcuate slot in said member, said third slot receiving said third pin thereby to mount said carrier for movement about a third axis passing through said third pin.

8. Film stripping means as set forth in claim 7 wherein each of said guide slots comprises two angularly disposed arcuate end portions intersecting with each other, and the center of curvature for one of said end portions of each of two of said slots is located within the boundary of the third one of said slots.

9. Film stripping means for directing the leading end of a strip of film from a roll of film during rotation of the film roll in an unwinding direction about a predetermined axis of rotation, said film stripping means comprising:
a member having a film stripping portion engageable with the film roll for separating the leading end of the film from the film roll;
a carrier for said member, said carrier being movable between first and second positions for moving said portion of the member into and out of engagement with the film roll;
means coupling said member to said carrier for rotational movement of the member with respect to the carrier about two spaced axes;
three spaced pulleys, a drive belt trained about said pulleys, said pulleys being arranged with respect to each other so that said belt has three reaches, said belt being movably mounted so that a portion of said belt can be moved into engagement with the film roll for driving said roll in a direction to unwind film from the roll; and
said coupling means includes guide means for controlling movement of said member with respect to the carrier and with respect to one reach of said belt so that said member is located in a predetermined position in spaced relation to said one reach of said belt when said member and said belt are in engagement with a roll of film.